UNITED STATES PATENT OFFICE.

ARTHUR H. WILLIAMS, OF MANCHESTER, NEW HAMPSHIRE.

MORTAR MATERIAL.

SPECIFICATION forming part of Letters Patent No. 392,483, dated November 6, 1888.

Application filed July 6, 1888. Serial No. 279,218. (No specimens.)

*To all whom it may concern:*

Be it known that I, ARTHUR H. WILLIAMS, a citizen of the United States, residing at Manchester, in the county of Hillsborough and State of New Hampshire, have invented certain new and useful Improvements in Mortar Material; and I do hereby declare the following to be a full, clear, and exact description of the invention, such as will enable others skilled in the art to which it appertains to make and use the same.

This invention refers to an improved mortar material or composition; and it consists in a mixture of ingredients substantially in the proportions to be hereinafter described and claimed.

In making my improved mortar I use Francestown soapstone, which is quarried at Francestown, New Hampshire, and which differs chemically from the ordinary soapstone or talc in that the latter contains no oxide of aluminium, ($Al_2O_3$,) which is contained in Francestown soapstone to the extent of ten per cent., and also talc has fifteen per cent. more silica ($SiO_2$) than Francestown soapstone, which contains forty-five per cent. of silica. To five parts of pulverized Francestown soapstone I add one part of cement and the two ingredients are thoroughly commingled. To one part of this mixture I next add one part of sharp fine sand and one part of slaked lime. After the ingredients are thus mixed the mortar is ready to apply and is complete with the exception of the coloring material. The mortar thus composed is designed especially to be mingled with a coloring material to produce a colored mortar. This coloring is added to the compound in any proportion desired just before the mixing. Any colors may be used that are desired— such as red, black, buff, &c. The resulting material makes a close, firm, and hard joint and gives an even color that will not fade or wash.

Having thus described my invention, what I claim as new, and desire to secure by Letters Patent, is—

1. The herein-described mortar material, consisting of cement, sand, slaked lime, and a soapstone containing ten per cent. of oxide of aluminium and some forty-five per cent. of silica, substantially as described.

2. The herein-described mortar material, consisting of a mixture of five parts of a soapstone containing ten per cent. of oxide of aluminium and forty-five per cent. of silica and one part of cement, in combination with one part of fine sand and one part of slaked lime and a coloring material, substantially as described.

3. The herein-described improved colored mortar material, consisting of one part of a mixture of cement and a soapstone containing ten per cent. of oxide of aluminium and forty-five per cent. of silica, one part of fine sand, one part of slaked lime, and a coloring material, substantially as described.

In testimony whereof I affix my signature in presence of two witnesses.

ARTHUR H. WILLIAMS.

Witnesses:
C. H. BARTLETT,
C. A. WILLIAMS.